United States Patent
Nix et al.

(10) Patent No.: US 8,682,897 B2
(45) Date of Patent: Mar. 25, 2014

(54) AGGREGATED PREFERENCE-DRIVEN SOCIAL CONTENT PLAYER

(75) Inventors: William Nix, Austin, TX (US); Roy Stedman, Austin, TX (US); Yuan-Chang Lo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 13/472,702

(22) Filed: May 16, 2012

(65) Prior Publication Data

US 2013/0311464 A1  Nov. 21, 2013

(51) Int. Cl.
G06F 17/30 (2006.01)

(52) U.S. Cl.
USPC ............................ 707/736; 707/748; 707/758

(58) Field of Classification Search
USPC .......................................... 707/736, 748, 758
See application file for complete search history.

(56) References Cited

U.S. PATENT DOCUMENTS

| | | | | |
|---|---|---|---|---|
| 7,571,183 | B2 * | 8/2009 | Renshaw et al. | 1/1 |
| 7,774,431 | B2 * | 8/2010 | Conn et al. | 709/219 |
| 2005/0273818 | A1 * | 12/2005 | Kobayashi | 725/46 |
| 2006/0074771 | A1 * | 4/2006 | Kim et al. | 705/26 |
| 2006/0112098 | A1 * | 5/2006 | Renshaw et al. | 707/7 |
| 2007/0265979 | A1 * | 11/2007 | Hangartner | 705/59 |
| 2011/0041157 | A1 * | 2/2011 | Dasher et al. | 725/98 |
| 2012/0290653 | A1 * | 11/2012 | Sharkey | 709/204 |
| 2013/0073387 | A1 * | 3/2013 | Heath | 705/14.53 |

* cited by examiner

*Primary Examiner* — Baoquoc N To
*Assistant Examiner* — Andalib Lodhi
(74) *Attorney, Agent, or Firm* — Terrile, Cannattai, Chambers & Holland, LLP; Stephen A. Terrile

(57) ABSTRACT

A system and method are disclosed for managing playlists of digital content. Digital content preference data is received from a plurality of users. The preference data is then processed to generate a group preference playlist, which contains references to digital content that is mutually preferred by each of the users. The group preference playlist is then initiated to play the mutually-preferred digital content.

15 Claims, 5 Drawing Sheets

US 8,682,897 B2

AGGREGATED PREFERENCE-DRIVEN SOCIAL CONTENT PLAYER

BACKGROUND OF THE INVENTION

1. Field of the Invention

Embodiments of the invention relate generally to information handling systems. More specifically, embodiments of the invention provide a system and method for managing playlists of digital content.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The volume of digital content (e.g., music, movies, videos, television shows, etc.) available to consumers continues to grow exponentially. Concurrently, identifying specific content that matches the preferences of individual users has become increasingly difficult. Even more challenging is discovering and recommending content that universally appeals to the tastes and preferences of a group of users.

As an example, a group of friends may get together, each of which provides a playlist of their favorite music. While it may be likely that some of the playlist selections will appeal to everyone in the group, it is just as likely that some selections will not. As another example, individual members of an online group may have each provided a playlist of streaming videos for the group to view together. Just as in the music playlist example, some selections may be universally liked, but it is doubtful that each video will be equally liked by everyone in the group. In fact, it is entirely possible that some videos will only be liked by the individual that provided it.

Current approaches to identifying a user's digital content preferences include simply matching previous playlists compiled by the user. Other, more sophisticated, approaches include projects such as Pandora® which analyzes a user's content selections and then perform predictive analytics operations to recommend similar content. However, no current approach provides the ability to generate a playlist of digital content that will appeal to a group of users.

SUMMARY OF THE INVENTION

A system and method are disclosed for managing playlists of digital content. In various embodiments, digital content preference data is received from a plurality of users. The preference data is then processed to generate a group preference playlist, which contains references to digital content that is mutually preferred by each of the users.

In various embodiments, the group preference playlist contains recommendations that are generated by using weighted values from ratings (e.g., positive for favorable, negative for unfavorable, etc.), history (e.g., viewing, listening, purchase, etc), selected review resources (e.g., profession, peer-based, etc.), and social (e.g., named social contacts, neighbors as determined by matching tastes and interests, etc.). In certain embodiments, the recommendations may also be generated according to the preferences of users who are not present or participating.

In these and other embodiments, the preference playlist is then initiated to play the mutually-preferred digital content. In one embodiment, the digital content is concurrently consumed by the group of users. In another embodiment, the digital content is consumed at different times by individual users of the group. In yet another embodiment, the group of users is collocated. In still another embodiment, the group of users is geographically distributed. In another embodiment, recalculation of the group preference playlist is triggered as content is played and rated as new members of the group arrive or old members of the group depart.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method is disclosed for managing playlists of digital content. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
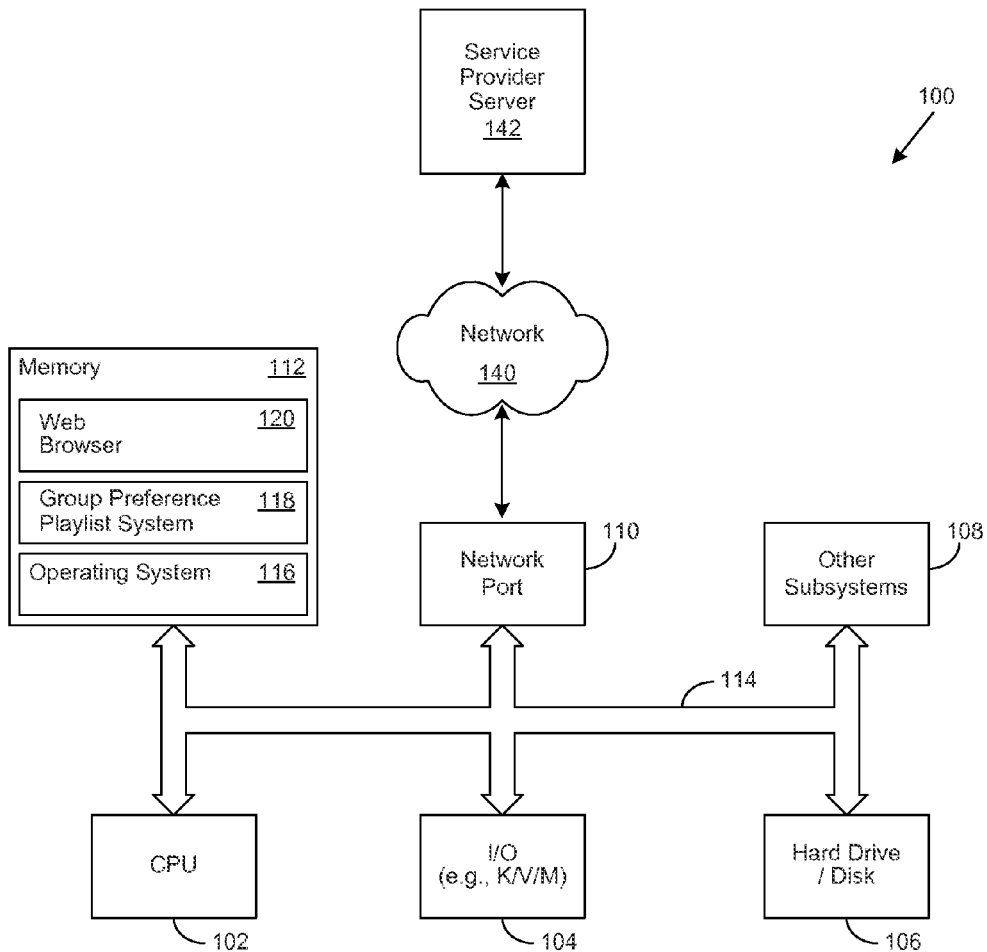
FIG. 1 is a generalized illustration of the components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and a Web browser 120. In various embodiments, the system memory 112 may also comprise a group preference playlist system 118. In one embodiment, the information handling system 100 is able to download the Web browser 120 and the group preference playlist system 118 from the service provider server 142. In another embodiment, the group preference playlist system 118 is provided as a service from the service provider server 142.

Figure 2:
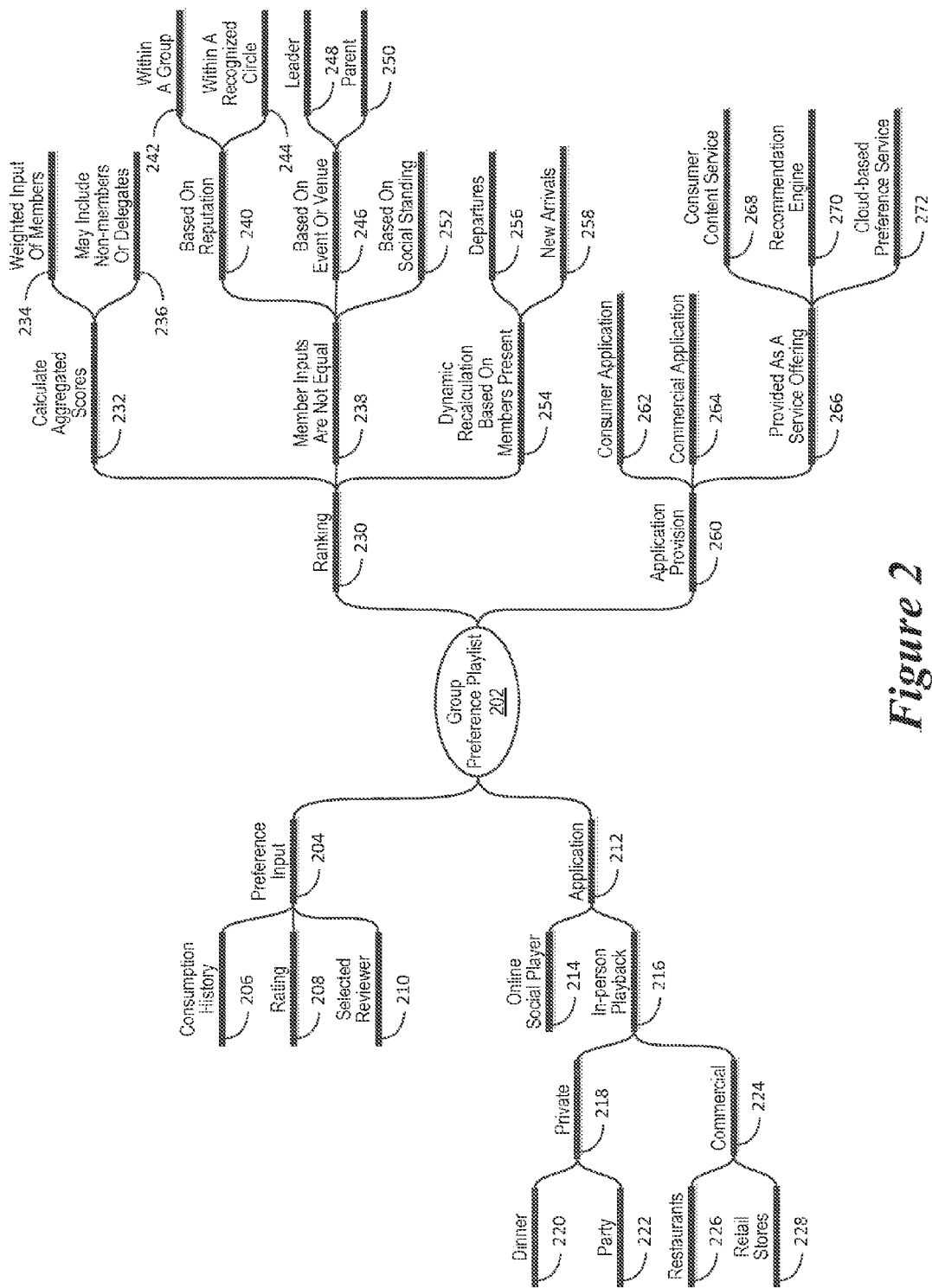
FIG. 2 is a simplified block diagram showing the interrelationship of a plurality of operational aspects associated with a group preference playlist.

FIG. 2 is a simplified block diagram showing the interrelationship of a plurality of operational aspects associated with a group preference playlist implemented in accordance with an embodiment of the invention. In various embodiments, digital content preference data is received from a plurality of users. The preference data is then processed to generate a group preference playlist, which contains references to digital content that is preferred by each of the users. In one embodiment, the group preference playlist contains references to digital content that everyone in the group is already familiar with. In another embodiment, the group preference playlist contains references to digital content that is familiar to individual users in the group. In yet another embodiment, the group preference playlist contains recommended digital content that is recommended, according to the preference data collected from individual users within the group. It will be appreciated that many combinations of these various embodiments are possible and that the foregoing is not intended to limit the spirit, scope or intent of the invention.

In various embodiments, the group preference playlist contains recommendations that are generated by using weighted values from ratings (e.g., positive for favorable, negative for unfavorable, etc.), history (e.g., viewing, listening, purchase, etc), selected review resources (e.g., profession, peer-based, etc.), and social (e.g., named social contacts, neighbors as determined by matching tastes and interests, etc.). In certain embodiments, the recommendations may also be generated according to the preferences of users who are not present or participating. For example, a movie reviewer, a music magazine, or a celebrity might provide playlist or movie recommendation lists that might be used as input for the preference calculations. In these various embodiments, a preference score is calculated for each digital content item, which is then ranked within the group preference playlist according to their respective preference scores. In certain embodiments, preference inputs may also be affected by overriding inputs that apply a veto or an overriding influence. Examples of these may include age appropriateness, veto rights owned by a "super user", reputation of a user (e.g., user 'A' has a high social media reputation, user 'B' has a low social media reputation, therefore user 'A' scores would influence selection of a digital content item more than user 'B').

In these and other embodiments, the group preference playlist is then initiated to play the mutually-preferred digital content. In one embodiment, the digital content is concurrently consumed by the group of users. In another embodiment, the digital content is consumed at different times by individual users of the group. In yet another embodiment, the group of users is collocated. In still another embodiment, the group of users is geographically distributed. In another embodiment, recalculation of the group preference playlist is triggered as content is played and rated as new members of the group arrive or old members of the group depart. In yet another embodiment, the group preference playlist keeps track of digital content that has been played. In this embodiment, previously-played digital content referenced in the recalculated group preference playlist is not replayed to avoid remaining group members hearing or viewing the same digital content twice. In still another embodiment, previously-played digital content referenced in the recalculated group preference playlist is replayed if all old group members that previously heard or viewed the digital content are no longer part of the current group. In these various embodiments, the digital content may reside on an individual user's digital content player, a digital content player operated by a venue (e.g., a restaurant or hotel), or a server operated "in the cloud" on a network. Skilled practitioners of the art will recognize that many such embodiments are possible and the foregoing is not intended to limit the spirit, scope or intent of the invention.

Referring now to FIG. 2, a group preference playlist 202 is comprised of a plurality of operational aspects, including a plurality of preference inputs 204, a plurality of applications 212, a plurality of digital content ranking 230 inputs, and a plurality of application provision 260 options. As shown in FIG. 2, the plurality of preference inputs 204 comprises consumption history 206 data, digital content rating 208, and digital content preference data associated with a selected reviewer 210. As likewise shown in FIG. 2, the plurality of applications 212 comprises an online social player 214 and in-person playback 216, which in turn comprises private 218 and commercial 224 playback.

In one embodiment, the online social media player 214 selects a streaming movie according to a group preference playlist. In this embodiment, the movie is viewed by a group while simultaneously conducting an online discussion in a side bar of a user interface (UI). In another embodiment, the group preference playlist is dynamically generated according to the individual preferences of a group of users. In this embodiment, the group preference playlist is dynamically adjusted as users join or leave the online group.

In yet another embodiment, the in-person media playback 216 comprises private 218 in-person playback, which in turn comprises a dinner 220 or a party 222 venue. For example, a group preference playlist may be pre-generated and contain music that has been selected according to the preferences of individual users in a guest list. In still another embodiment, the commercial 224 in-person playback comprises restaurant 226 and retail store 228 venues. In one embodiment, the group preference playlist is dynamically adjusted as new guests arrive. In another embodiment, the arrival of the guest is determined through the use of a Location Based Service (e.g., user 'X' smartphone is in a geographic location) or Near Field Communication (NFC) check-in. In yet another embodiment, a public venue such as a restaurant provides a music service that is plays music that matches the preferences of their customers. In this embodiment, the group preference playlist is generated according to customers pre-registering through reservation services such as OpenTable®, or check-in services such as FourSquare®.

As also shown in FIG. 2, the plurality of digital content ranking 230 inputs comprise inputs that are calculated from aggregate scores 232, inputs from group members that are not equal 238, and inputs that are dynamically recalculated based upon the presence of group members 254. In one embodiment, inputs that are calculated from aggregate scores 232 are calculated from the weighted input of members 234, calculated from the input of non-members, or delegates, 236 of the target group, or both. In another embodiment, inputs from group members that are not equal 238 are based upon the social media reputation 240 of a group member, based upon an event (e.g., dinner or party) or venue (e.g., restaurant or club) 252, or based upon the social media standing 252 of a group member. In turn, the inputs that are based upon the social media reputation 240 of a group member are based upon users within a group 242, within a recognized circle 244 of users, or both. Likewise, inputs based upon an event or venue 252 are further based upon whether inputs are received from a leader 248, a parent 250, or both. In yet another embodiment, inputs that are dynamically recalculated based upon the presence of group members 254 are recalculated according to members of a group that are departures 256 or new arrivals 258 of the group.

Referring once again to FIG. 2, the plurality of application provision 260 inputs comprises one or more consumer applications 262, one or more commercial applications 264, or one or more service offerings 266. In turn, the one or more service offerings 266 comprise one or more consumer content services 288, one or more recommendation engines 270, or one or more cloud-based preference services 272.

Figure 3:
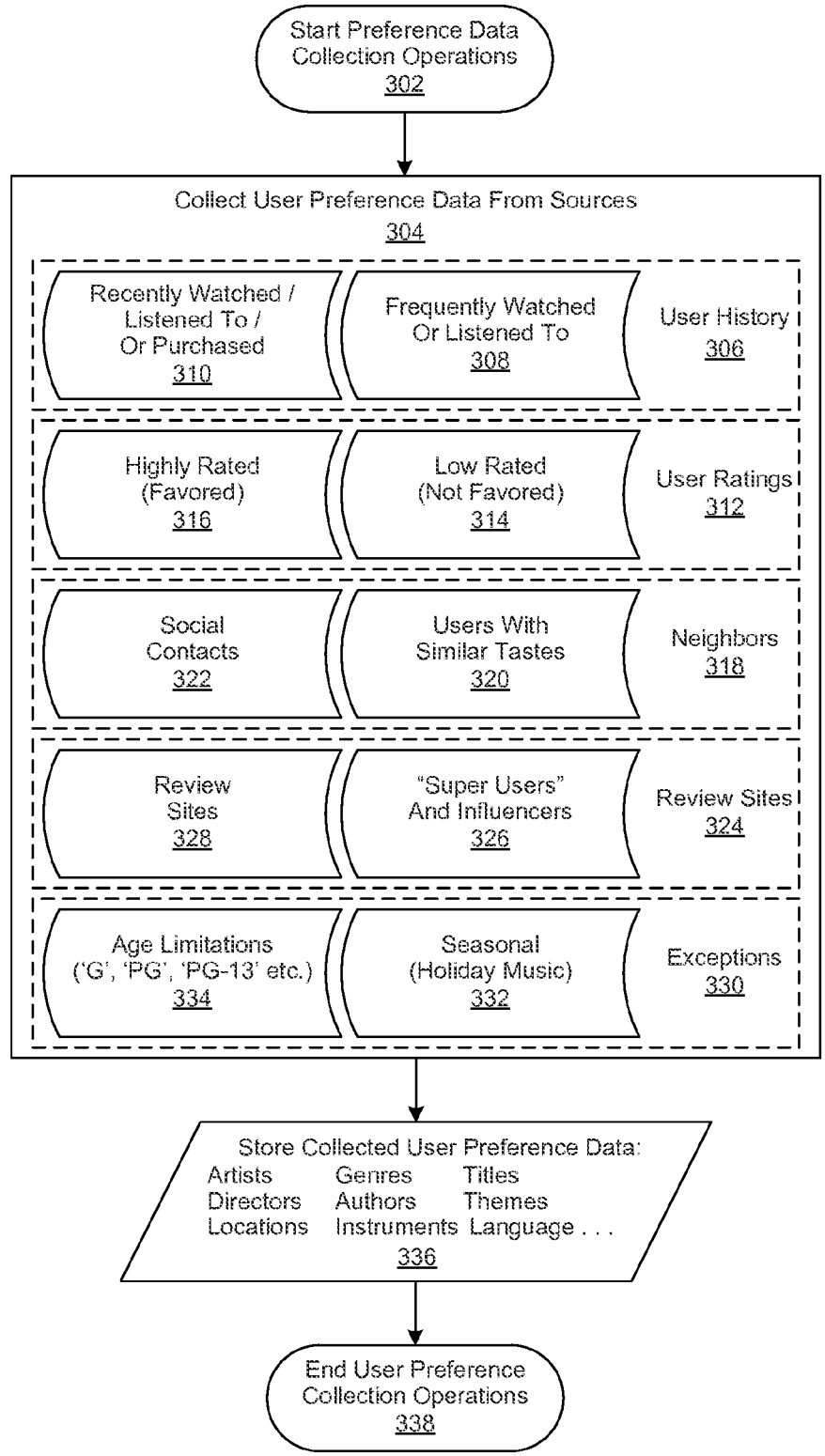
FIG. 3 is a generalized flow chart of operations associated with collecting digital content preference data.

FIG. 3 is a generalized flow chart of operations implemented in accordance with an embodiment of the invention to collect digital content preference data. In this embodiment, digital content preference data collection operations are begun in step 302, followed by the collection of digital content preference data from a plurality of sources in step 304. In one embodiment, the digital content preference data corresponds to an individual user. In another embodiment, the digital content preference data corresponds to individual users in a plurality of users. As an example, the plurality of users may be members of a group having something in common. The collected digital content preference data is then stored in step 306. Digital content preference data collection operations are then ended in step 308.

As shown in FIG. 3, the sources of the user preference data may comprise user history 306, user ratings 312, 'neighbors' 318, review sites 324, and exceptions 330. In one embodiment, the user history 306 user preference data may comprise data related to digital content that is frequently watched or listened to 308, or alternatively, digital content that has been recently watched, listened to, or purchased 310. In another embodiment, the user ratings 312 user preference data may comprise data related to digital content that is low rated (i.e., not favored) 314 or highly-rated (i.e., favored) 316. In yet another embodiment, the 'neighbors' 318 user preference data may comprise preference data corresponding to users with similar tastes 320 or to users that are social contacts 322. In still another embodiment, the review sites 324 user preference data may comprise preference data corresponding to "super users" and influencers 324 or digital content review sites 328. In one embodiment, the exceptions 330 user preference data may comprise preference data associated with seasonal 332 digital content, such as holiday music, or with age limitation 334 ratings (e.g., 'G', 'PG, "PG-13', etc.).

As likewise show in FIG. 3, the collected user data may comprise data corresponding to preferred artists, genres, titles, directors, authors, themes, locations, instruments, language, and on forth. Those of skill in the art will appreciate that many such embodiments are possible and that the foregoing is not intended to limit the spirit, scope, or intent of the invention.

Figure 4:
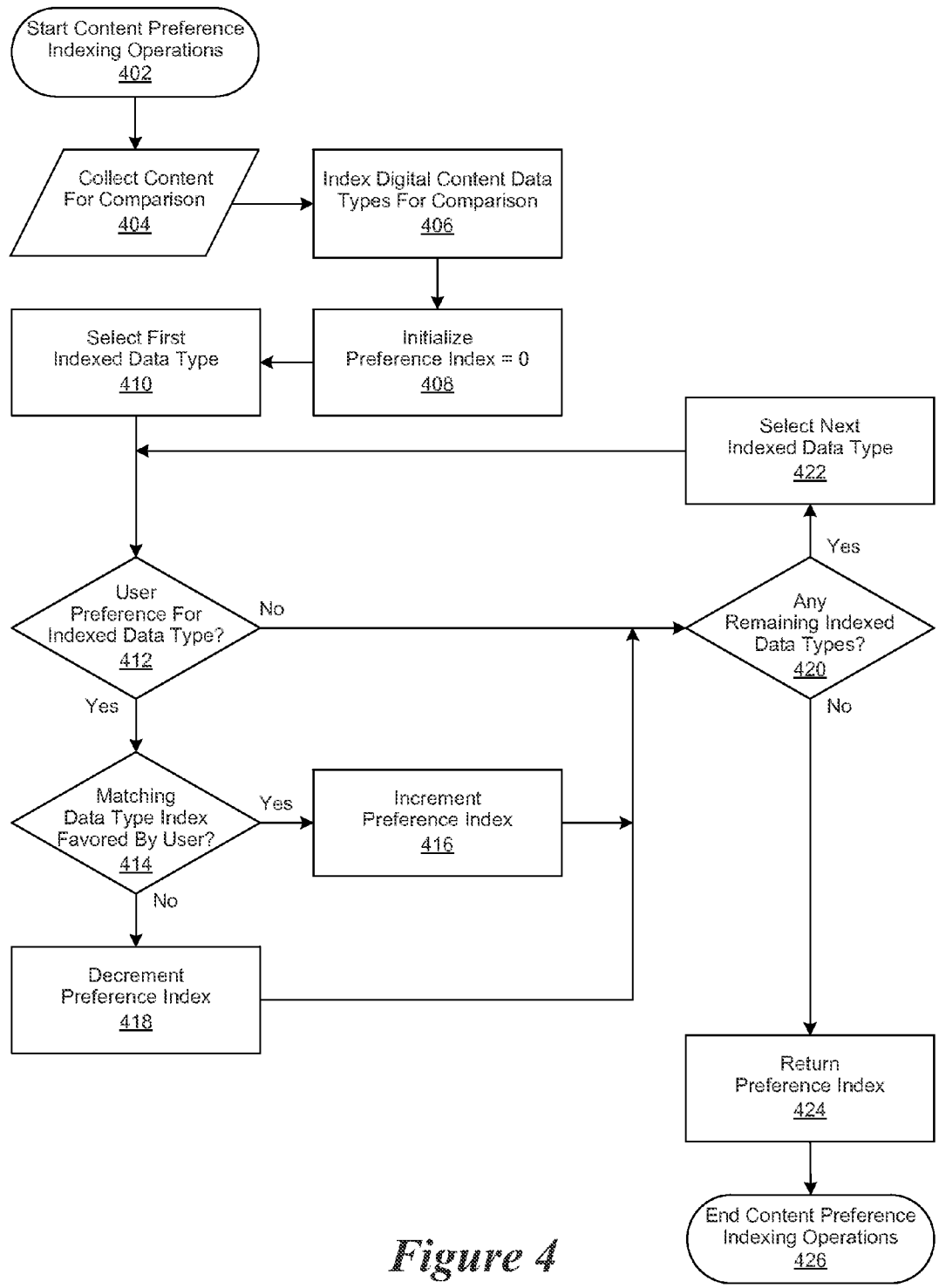
FIG. 4 is a generalized flow chart of operations associated with using preference data corresponding to an individual user to generate a digital content preference index value.

FIG. 4 is a generalized flow chart of operations implemented in accordance with an embodiment of the invention to use preference data corresponding to an individual user to generate a digital content preference index value as implemented in accordance with an embodiment of the invention. In this embodiment, user content preference indexing operations are begun in step 402, followed by the collection of digital content for comparison operations in step 404. Then, in step 406, various digital content data types (e.g., music, movies, videos, television shows, etc.) are indexed in step 406 for later comparison operations. In various embodiments, these various digital content data types may have additional index values, each of which corresponds to a sub-category (e.g., 'country' music vs. 'classical' music). A user's preference index is then initialized for a '0' value in step 408, followed by the selection of a first indexed data type in step 410.

A determination is then made in step 412 whether the user has a preference for the selected indexed data type. If so, then a determination is made in step 414 whether there is a matching data type index that is favored by the user. If so, then the preference index is incremented in step 416. If not, then the preference index is decremented in step 418. Once the preference index is respectively incremented in step 416, or decremented in step 418, or if it is determined in step 412 that the user does not have a preference for the indexed data type, then a determination is made in step 420 whether there are any remaining indexed data type. If so, then the next indexed data type is selected in step 422 and the process is continued, proceeding with step 412. Otherwise the preference index is returned in step 424 and user content preference indexing operations are ended in step 426.

Figure 5:
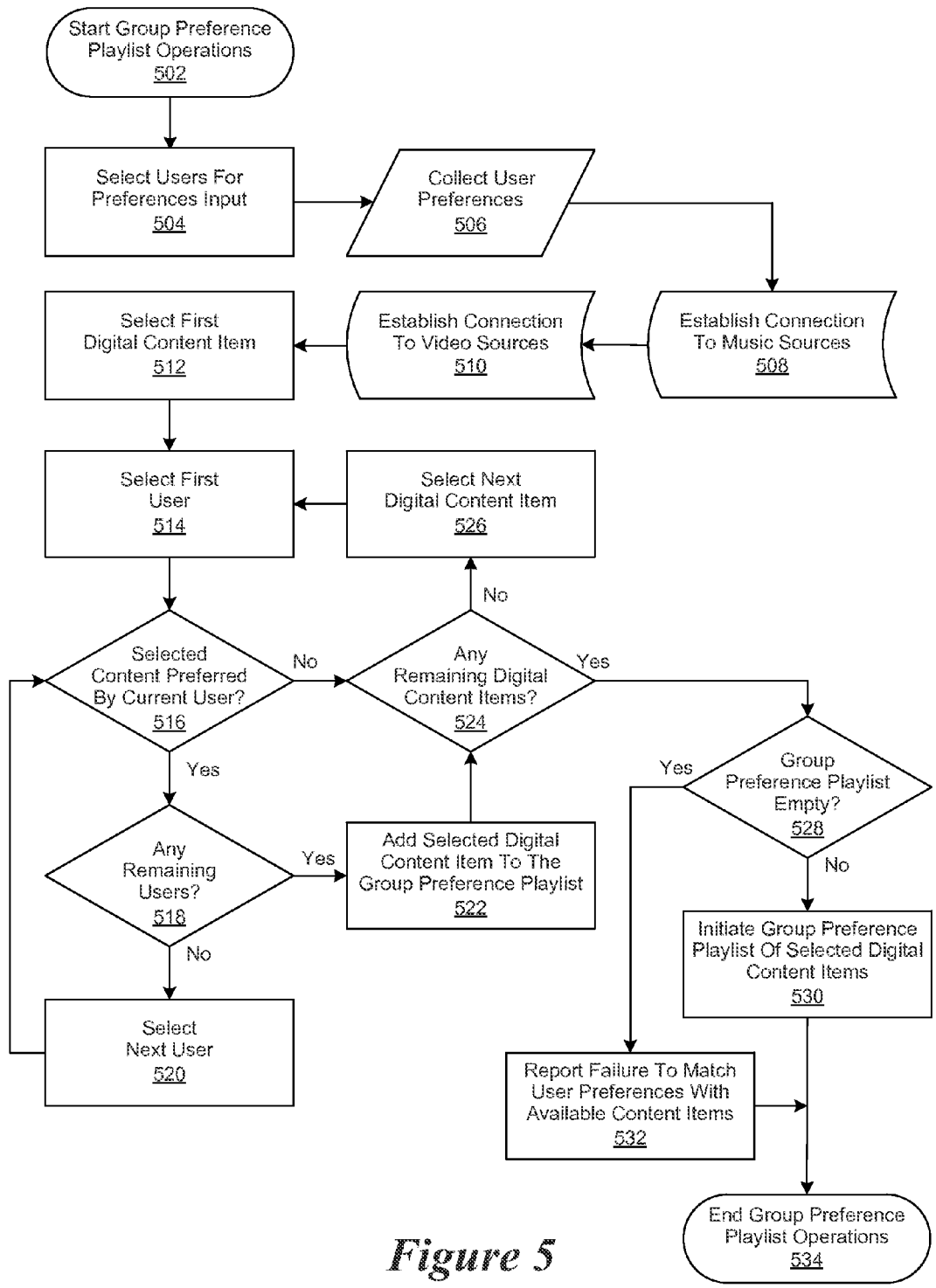
FIG. 5 is a generalized flow chart of operations associated with using preference data corresponding to a plurality of users to generate a group preference playlist.

FIG. 5 is a generalized flow chart of operations implemented accordance with an embodiment of the invention to use preference data corresponding to a plurality of users to generate a group preference playlist. In this embodiment, group (preference playlist selection operations are begun in step 502, followed by the selection in step 504 of a target group of users for digital content preferences input. User preferences, as described in greater detail herein, are then collected in step 506, subsequently followed by the connection to music sources in step 508 and video sources in step 510. The first digital content item is then selected in step 512, followed by the selection of a first member of the target group of users in step 514.

A determination is then made in step 516 whether the selected digital content item is preferred by the current user. If not, then a determination is made in step 524 whether there are any remaining digital content items. If not, then the next digital content item is selected in step 526 and the process is continued, proceeding with step 514. However, if it is determined in step 516 that the selected digital content item is not preferred by the current user, then a determination is made in step 518 whether there are any remaining users. If not, the next user is selected in step 520 and the process is continued, proceeding with step 516. Otherwise, the selected digital content item is added to the group preference playlist in step 522.

A determination is then made in step 522 whether there are any remaining digital content items. If not, then the process is continued, proceeding with step 526. Otherwise, a determination is made in step 528 whether the group preference playlist is empty. If so, then the failure to match user preferences with available digital content items is reported in step 532. Otherwise, the group preference playlist of selected digital content items is initiated in step 530. Thereafter, or the failure to match user preferences with available digital content items is reported in step 532, group preference playlist selection operations are ended in step 534.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for managing digital content, comprising:
    receiving via an information handling system a first set of digital content attributes preferred by a first user and a second set of digital content attributes preferred by a second user;
    processing via the information handling system the first and second sets of digital content attributes to generate a third set of digital content attributes mutually preferred by the first and second user;
    processing via the information handling system a first set of digital content items to generate a first playlist referencing a second set of digital content items corresponding to the third set of digital content attributes; and
    initiating via the information handling system the first playlist to play the second set of digital content items; and wherein
    a fourth set of digital content attributes preferred by a third user is received;
    the third and fourth sets of digital content attributes are processed to generate a fifth set of digital content attributes mutually preferred by the first, second and third user;
    the second set of digital content items is processed to generate a second playlist referencing a third set of digital content items corresponding to the fifth set of digital content items; and
    the second playlist is initiated to play the third set of digital content items.

2. The method of claim 1, wherein:
    the third set of digital content attributes are processed to generate a preference attribute for individual digital content items of the second set of digital content items; and
    the preference attribute of each of the individual is used by the playlist to determine the order in which the individual digital content items are played.

3. The method of claim 1, wherein:
    the second and fourth sets of digital content attributes are processed to generate a sixth set of digital content attributes mutually preferred by the second and third user;
    the first set of digital content items is processed to generate a third playlist referencing a fourth set of digital content items corresponding to the sixth set of digital content items; and
    the third playlist is initiated to play the fourth set of digital content items.

4. The method of claim 1, wherein the source of the first and second set of digital content attributes includes at least one of the set of:
    a user's digital content playing history;
    a user's digital content purchase history;
    a user digital content ratings;
    users with similar preferences; and
    digital content review sites.

5. The method of claim 1, wherein the first and second set of digital content attributes includes at least one of the set of:
    artists;
    genres;
    titles;
    directors;
    authors;
    themes;
    locations;
    instruments; and
    language.

6. A system comprising:
    a processor;
    a data bus coupled to the processor; and
    a non-transitory storage medium embodying program code, the non-transitory, storage medium being coupled to the data bus, the program code interacting with a plurality of operations and comprising instructions executable by the processor and configured for:
        receiving a first set of digital content attributes preferred by a first user and a second set of digital content attributes preferred by a second user;
        processing the first and second sets of digital content attributes to generate a third set of digital content attributes mutually preferred by the first and second user;
        processing a first set of digital content items to generate a first playlist referencing a second set of digital content items corresponding to the third set of digital content attributes; and initiating the first playlist to play the second set of digital content items; and wherein a fourth set of digital content attributes preferred by a third user is received;

the third and fourth sets of digital content attributes are processed to generate a fifth set of digital content attributes mutually preferred by the first, second and third user;

the second set of digital content items is processed to generate a second playlist referencing a third set of digital content items corresponding to the fifth set of digital content items; and the second playlist is initiated to play the third set of digital content items.

7. The system of claim 6, wherein:

the third set of digital content attributes are processed to generate a preference attribute for individual digital content items of the second set of digital content items; and the preference attribute of each of the individual is used by the playlist to determine the order in which the individual digital content items are played.

8. The system of claim 6, wherein:

the second and fourth sets of digital content attributes are processed to generate a sixth set of digital content attributes mutually preferred by the second and third user;

the first set of digital content items is processed to generate a third playlist referencing a fourth set of digital content items corresponding to the sixth set of digital content items; and the third playlist is initiated to play the fourth set of digital content items.

9. The system of claim 6, wherein the source of the first and second set of digital content attributes includes at least one of the set of:

a user's digital content playing history;
a user's digital content purchase history;
a user digital content ratings;
users with similar preferences; and
digital content review sites.

10. The system of claim 6, wherein the first and second set of digital content attributes includes at least one of the set of:

artists;
genres;
titles;
directors;
authors;
themes;
locations;
instruments; and
language.

11. A non-transitory storage medium embodying program code, the program code comprising processor executable instructions configured for:

receiving a first set of digital content attributes preferred by a first user and a second set of digital content attributes preferred by a second user;

processing the first and second sets of digital content attributes to generate a third set of digital content attributes mutually preferred by the first and second user;

processing a first set of digital content items to generate a first playlist referencing a second set of digital content items corresponding to the third set of digital content attributes; and initiating the first playlist to play the second set of digital content items; and wherein a fourth set of digital content attributes preferred by a third user is received;

the third and fourth sets of digital content attributes are processed to generate a fifth set of digital content attributes mutually preferred by the first, second and third user;

the second set of digital content items is processed to generate a second playlist referencing a third set of digital content items corresponding to the fifth set of digital content items; and the second playlist is initiated to play the third set of digital content items.

12. The non-transitory storage medium of claim 11, wherein:

the third set of digital content attributes are processed to generate a preference attribute for individual digital content items of the second set of digital content items; and the preference attribute of each of the individual is used by the playlist to determine the order in which the individual digital content items are played.

13. The non-transitory storage medium of claim 11, wherein:

the second and fourth sets of digital content attributes are processed to generate a sixth set of digital content attributes mutually preferred by the second and third user;

the first set of digital content items is processed to generate a third playlist referencing a fourth set of digital content items corresponding to the sixth set of digital content items; and the third playlist is initiated to play the fourth set of digital content items.

14. The non-transitory storage medium of claim 11, wherein the source of the first and second set of digital content attributes includes at least one of the set of:

a user's digital content playing history;
a user's digital content purchase history;
a user digital content ratings;
users with similar preferences; and
digital content review sites.

15. The non-transitory storage medium of claim 11, wherein the first and second set of digital content attributes includes at least one of the set of:

artists;
genres;
titles;
directors;
authors;
themes;
locations;
instruments; and
language.

* * * * *